United States Patent
Bocking et al.

(10) Patent No.: US 8,364,082 B2
(45) Date of Patent: *Jan. 29, 2013

(54) HANDHELD ELECTRONIC DEVICE INCLUDING SIMPLIFIED ENABLING AND DISABLING OF SHORT-RANGE WIRELESS COMMUNICATIONS ELEMENT, AND ASSOCIATED METHOD

(75) Inventors: Andrew Douglas Bocking, Waterloo (CA); Omar G. J. Barake, Waterloo (CA); David I. Shifman, Chiswick (GB)

(73) Assignee: Research In Motion Limited, Waterloo (CA)

( * ) Notice: Subject to any disclaimer, the term of this patent is extended or adjusted under 35 U.S.C. 154(b) by 158 days.

This patent is subject to a terminal disclaimer.

(21) Appl. No.: 12/861,597

(22) Filed: Aug. 23, 2010

(65) Prior Publication Data
US 2010/0317290 A1    Dec. 16, 2010

Related U.S. Application Data

(63) Continuation of application No. 10/941,488, filed on Sep. 15, 2004, now Pat. No. 7,783,256.

(51) Int. Cl.
*H04B 7/00* (2006.01)

(52) U.S. Cl. .................... 455/41.2; 455/566

(58) Field of Classification Search ............... 455/41.2, 455/41.3, 66.1, 517, 518, 519, 566
See application file for complete search history.

(56) References Cited

U.S. PATENT DOCUMENTS
7,761,607 B2 *   7/2010   Hassan et al. ............... 709/250

* cited by examiner

*Primary Examiner* — Quochien B Vuong
(74) *Attorney, Agent, or Firm* — Novak Druce + Quigg LLP

(57) ABSTRACT

An improved handheld electronic device and an associated method provide a simplified mechanism for enabling and disabling a short-range wireless communications element used to create a connection to a short-range wireless network, such as a Bluetooth™ network. The method, implemented by the handheld electronic device, includes enabling the short-range wireless communications element, pairing the handheld electronic device with a second electronic device using the short-range wireless communications element, and providing a first icon on the handheld electronic device after pairing the handheld electronic device with the second electronic device. Thereafter, the method includes disabling the short-range wireless communications element and providing a second icon on the handheld electronic device whenever the first icon is activated, and enabling the short-range wireless communications element and providing the first icon on the handheld electronic device whenever the second icon is activated.

18 Claims, 6 Drawing Sheets

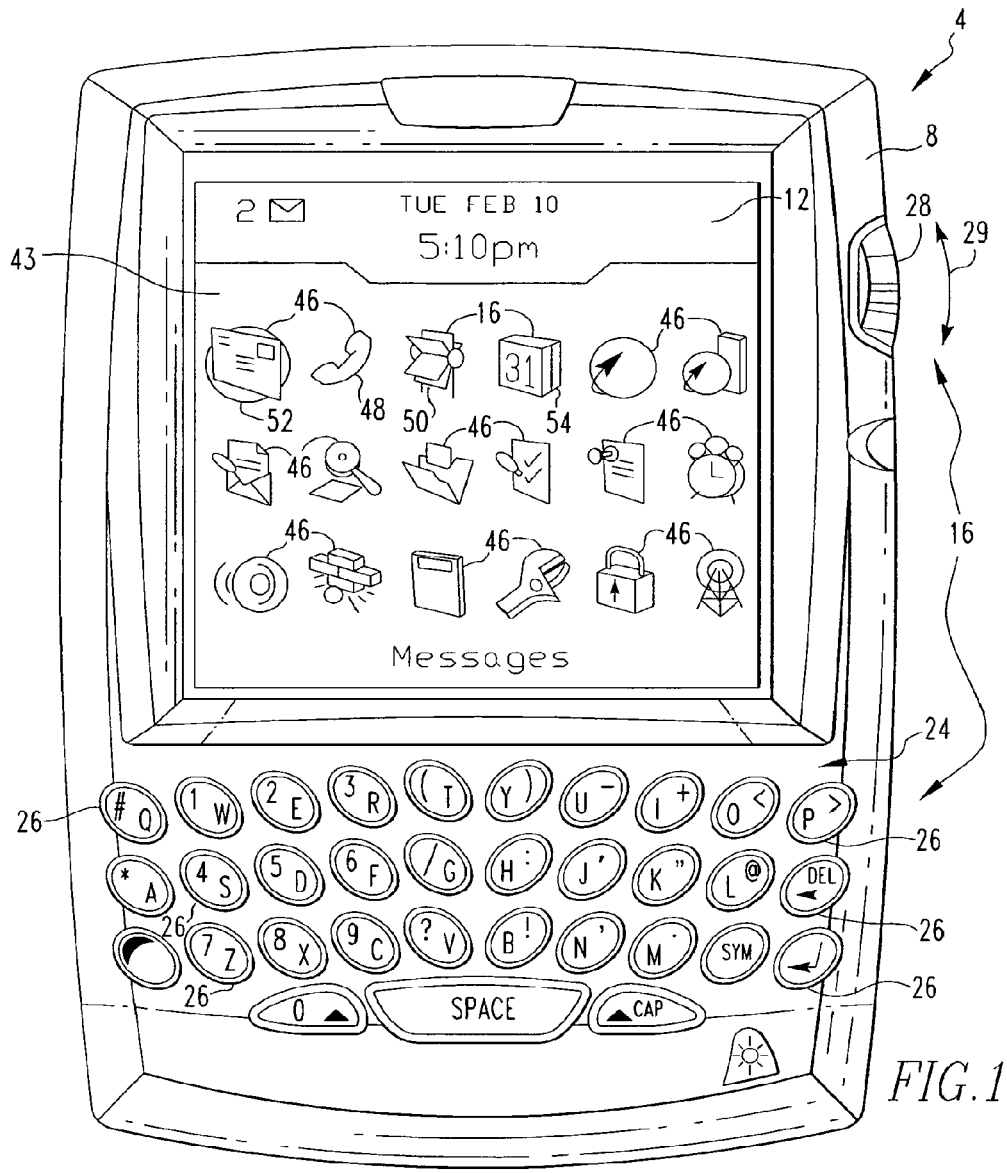
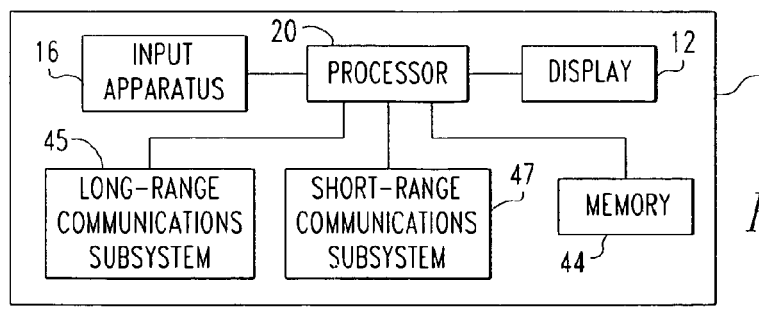

HANDHELD ELECTRONIC DEVICE INCLUDING SIMPLIFIED ENABLING AND DISABLING OF SHORT-RANGE WIRELESS COMMUNICATIONS ELEMENT, AND ASSOCIATED METHOD

CROSS-REFERENCE TO RELATED APPLICATION

This application is a continuation of application Ser. No. 10/941,488, filed on Sep. 15, 2004, the entire content of which is hereby incorporated by reference for all purposes.

BACKGROUND OF THE INVENTION

1. Field of the Invention

The invention relates generally to handheld electronic devices and, more particularly, to a handheld electronic device having an improved mechanism for enabling and disabling a short-range wireless communications element used to create a connection to a short-range wireless network, such as a Bluetooth™ network. The invention also relates to an improved method of enabling and disabling such a short-range wireless communications element.

2. Description of the Related Art

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus are relatively small.

Many handheld electronic devices include and provide access to a wide range of integrated applications, including, without limitation, email, telephone, short message service (SMS), multimedia messaging service (MMS), browser, calendar and address book applications, such that a user can easily manage information and communications from a single, integrated device. These applications are typically selectively accessible and executable through a user interface that allows a user to easily navigate among and within these applications.

In addition, handheld electronic devices often include short-range communications functionality that enables the handheld electronic device to communicate wirelessly over a short-range wireless network with other similarly equipped mobile and stationary electronic devices. For example, many handheld electronic devices include a Bluetooth™ communications module for enabling the handheld electronic device to communicate with other Bluetooth™ enabled mobile or stationary electronic devices over a Bluetooth™ short-range wireless network.

As is known in the art, Bluetooth™ is a wireless technology standard developed by a "Special Interest Group" comprised of members of the telecommunications, computing, and networking industries that allows mobile and stationary electronic devices to communicate with each other over short distances (typically less than 30 feet). Bluetooth™ uses radio frequency (RF) waves in the 2.4 Gigahertz range, and is designed to be a secure and inexpensive way of connecting between devices without wires. Bluetooth™ requires that each device be equipped with a Bluetooth™ communications element, such as the STLC2500 chip sold by STMicroelectronics of Geneva, Switzerland, that includes an RF transceiver element for sending and receiving information according to the Bluetooth™ standard.

When Bluetooth™-capable devices come within range of one another, an electronic conversation takes place to determine whether they have data to share or whether one needs to control the other. Once the conversation has occurred, the devices form an ad hoc network, called a piconet, that may fill a room or may encompass no more distance than that between a cell phone on a belt-clip and a headset on a person's head. Once a piconet is established, the members (which may range from two to eight devices) randomly hop frequencies in unison so they stay in touch with one another and avoid other piconets that may be operating in the same area.

Traditionally, if a user of a Bluetooth™-capable handheld electronic device wanted to enable and/or disable the Bluetooth™ communications module of the device, the user had to navigate through numerous options/settings screens to reach the controls for enabling and/or disabling the Bluetooth™ communications module. Such traditional devices are said to have "buried" Bluetooth™ on/off controls. Because of the added difficulty in enabling and/or disabling the Bluetooth™ communications module, users of such traditional devices typically either rarely enabled the Bluetooth™ functionality or left the Bluetooth™ communications module enabled indefinitely, thereby unnecessarily depleting battery power. As will be appreciated, these same problems may also apply to other short-range wireless communications technologies employed by a handheld electronic device for communicating with other devices. Thus, there is a need for a handheld electronic device having an improved, simplified mechanism for enabling and disabling a short-range wireless communications element used to create a connection to a short-range wireless network, such as a Bluetooth™ network.

SUMMARY OF THE INVENTION

An improved handheld electronic device and an associated method provide for simplified enabling and disabling of a short-range wireless communications element used to create a connection to a short-range wireless network, such as a Bluetooth™ network. As a result, a user is able to more readily actively manage the functioning of the handheld electronic device to avoid unnecessary and wasteful (in terms of battery power) use of the short-range communications element of the handheld electronic device.

These and other aspects of the invention are provided by a method of enabling and disabling a short-range wireless communications element of a handheld electronic device, including enabling the short-range wireless communications element, pairing the handheld electronic device with a second electronic device using the short-range wireless communications element, and providing a first icon on the handheld electronic device after the handheld electronic device has been paired with a second electronic device. Thereafter, the method includes disabling the short-range wireless communications element and providing a second icon on the handheld electronic device whenever the first icon is activated, and enabling the short-range wireless communications element and providing the first icon on the handheld electronic device whenever the second icon is activated. In one particular embodiment, the short-range wireless communications element is a Bluetooth communications element used to wirelessly communicate with other similarly equipped mobile and stationary devices. In the embodiment, the first icon is preferably a "Turn Bluetooth Off" icon and the second icon is preferably a "Turn Bluetooth On" icon. The short-range wireless communications element includes a transmitter/receiver element (could be separate components or a singled integrated component), and enabling the short-range wireless communications element comprises turning the transmitter/receiver element on and disabling the short-range wireless communications element comprises turning the transmitter/receiver element off. When enabled, the short-range wireless communications element consumes battery power, and when disabled, the short-range wireless communications element does not consume battery power. Preferably, although not necessarily, the first and second icons are displayed on the home screen of the handheld electronic device.

According to another aspect of the invention, an improved handheld electronic device is provided that includes a display, a short-range wireless communications element, a processor and a memory storing one or more routines executable by the processor. The one or more routines include instructions for performing the various embodiments of the improved method of enabling and disabling the short-range wireless communications element described above.

BRIEF DESCRIPTION OF THE DRAWINGS

A full understanding of the invention can be gained from the following Description of the Preferred Embodiment when read in conjunction with the accompanying drawings in which:

FIG. 1 is a front view of an improved handheld electronic device in accordance with the invention;

FIG. 2 is a block diagram of the handheld electronic device of FIG. 1;

Similar numerals refer to similar parts throughout the specification.

DESCRIPTION OF THE PREFERRED EMBODIMENT

Figure 3:
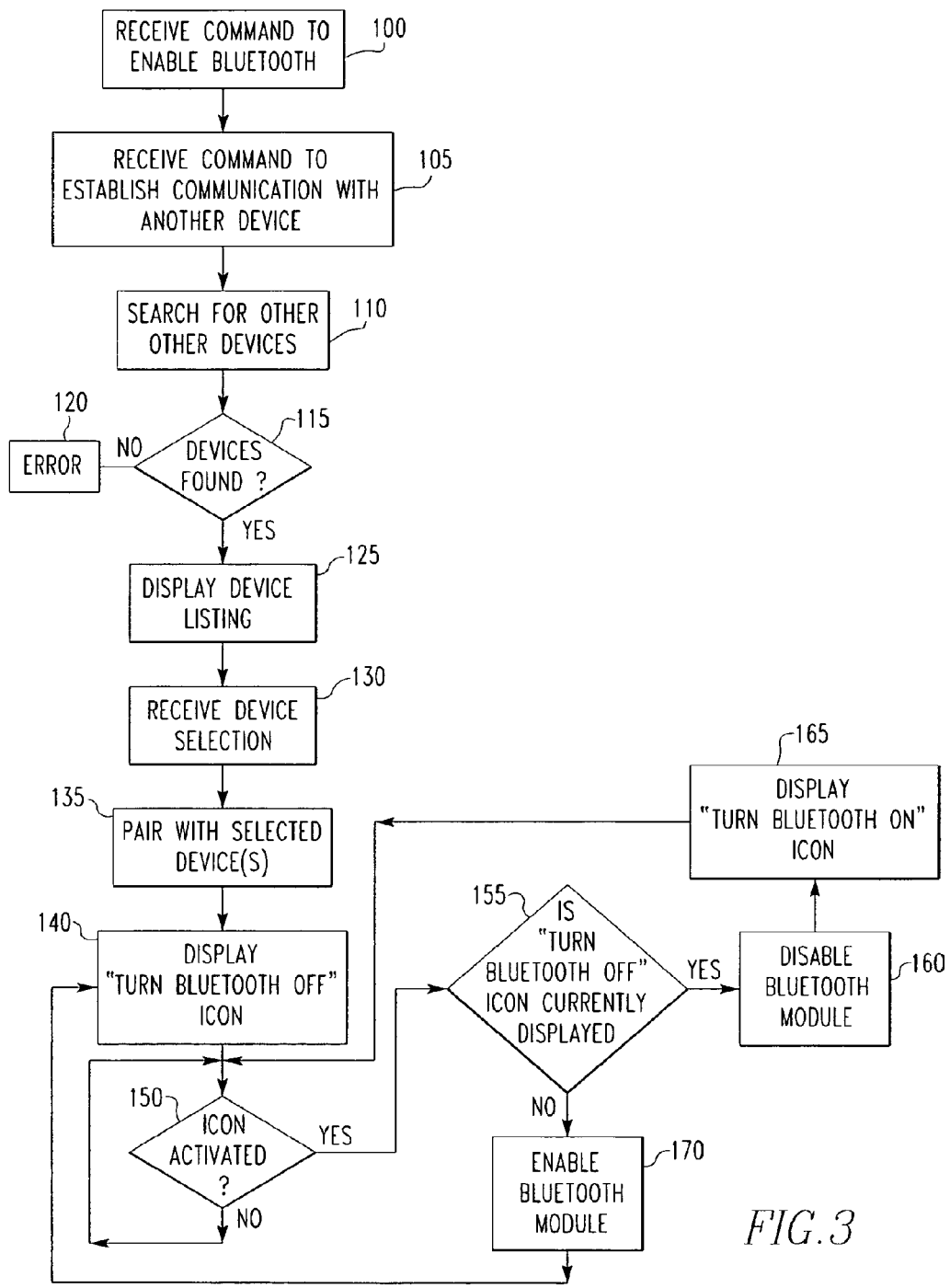
FIG. 3 is a flowchart depicting a routine executed by the processor of the handheld electronic device of FIGS. 1 and 2 for enabling and disabling a short-range wireless communications element used to create a connection to a short-range wireless network.

An improved handheld electronic device 4 in accordance with the invention is depicted generally in FIGS. 1 and 2. The handheld electronic device 4 includes a housing 8, a display 12, an input apparatus 16, and a processor 20 (FIG. 2) which may be, without limitation, a microprocessor (μP). The processor 20 is responsive to inputs received from the input apparatus 16 and provides outputs to the display 12. While for clarity of disclosure reference has been made herein to the exemplary display 12 for displaying various types of information, it will be appreciated that such information may be stored, printed on hard copy, be computer modified, or be combined with other data, and all such processing shall be deemed to fall within the terms "display" or "displaying" as employed herein. Examples of handheld electronic devices are included in U.S. Pat. Nos. 6,452,588 and 6,489,950, which are incorporated by reference herein.

As can be understood from FIG. 1, the input apparatus 16 includes a keyboard 24 having a plurality of keys 26, and a rotatable thumbwheel 28. As used herein, the expression "key" and variations thereof shall refer broadly to any of a variety of input members such as buttons, switches, and the like without limitation. The keys 26 and the rotatable thumbwheel 28 are input members of the input apparatus 16, and each of the input members has a function assigned thereto. As used herein, the expression "function" and variations thereof can refer to any type of process, task, procedure, routine, subroutine, function call, or other type of software or firmware operation that can be performed by the processor 20 of the handheld electronic device 4.

As is shown in FIG. 2, the processor 20 is in electronic communication with memory 44. Memory 44 can be any of a variety of types of internal and/or external storage media such as, without limitation, RAM, ROM, EPROM(s), EEPROM(s), and the like, that provide a storage register for data storage such as in the fashion of an internal storage area of a computer, and can be volatile memory or nonvolatile memory. The memory 44 further includes a number of applications executable by processor 20 for the processing of data. The applications can be in any of a variety of forms such as, without limitation, software, firmware, and the like, and the term "application" herein shall include one or more routines, subroutines, function calls or the like, alone or in combination.

As is also shown in FIG. 2, processor 20 is in electronic communication with long-range communications subsystem 45. Long-range communications functions for handheld electronic device 4, including data and voice communications, are performed through long-range communications subsystem 45. Long-range communications subsystem 45 includes a transmitter and a receiver (possibly combined in a single transceiver component) and one or more antennas. Other known components, such as a digital signal processor and a local oscillator, may also be part of long-range communications subsystem 45. The specific design and implementation of long-range communications subsystem 45 is dependent upon the communications network in which handheld electronic device 4 is intended to operate. For example, handheld electronic device 4 may include a long-range communications subsystem 45 designed to operate with the Mobiltex™, DataTAC™ or General Packet Radio Service (GPRS) mobile data communication networks and also designed to operate with any of a variety of voice communications networks, such as AMPS, TDMA, CDMA, PCS, GSM, and other suitable networks. Other types of data and voice networks, both separate and integrated, may also be utilized with handheld electronic device 4.

Processor 20 is also in electronic communication with short-range communications subsystem 47. Short-range communications subsystem 47 enables handheld electronic device 4 to communicate wirelessly over a short-range, i.e., on the order of thirty feet or less, wireless network with other similarly equipped mobile and stationary electronic devices, including, without limitation, other handheld electronic devices, computers, telephones and printers. Short-range communications subsystem 47 may, for example, include an infrared device and associated circuits and components, or a Bluetooth™ communication module to provide for communication with similarly-enabled systems and devices. In the preferred embodiment of the invention, short-range communications subsystem 47 includes a Bluetooth™ communication module for enabling handheld electronic device 4 to communicate with other Bluetooth™ enabled mobile or stationary electronic devices over a Bluetooth™ short-range wireless network. The Bluetooth communications module comprises a Bluetooth™ communications element, such as the STLC2500 chip sold by STMicroelectronics of Geneva, Switzerland, that includes an RF transceiver element (or, alternatively, a separate RF transmitter and RF receiver). Together, processor 20, memory 44, long-range communications subsystem 45 and/or short-range communications subsystem 47 may, along with other components (having various types of functionality), be referred to as a processing unit.

In FIG. 1, the display 12 is depicted as displaying a home screen 43 that includes a number of applications depicted as discrete icons 46, including, without limitation, an icon representing a phone application 48, an address book application 50, a messaging application 52 which includes email, SMS and MMS applications, and a calendar application 54. In FIG. 1, the home screen 43 is currently active and would constitute a portion of an application. Other applications, such as phone application 48, address book application 50, messaging application 52, and calendar application 54 can be initiated from the home screen 43 by providing an input through the input apparatus 16, such as by rotating the thumbwheel 28 and providing a selection input by translating the thumbwheel 28 in the direction indicated by the arrow 29 in FIG. 1.

Figure 4:
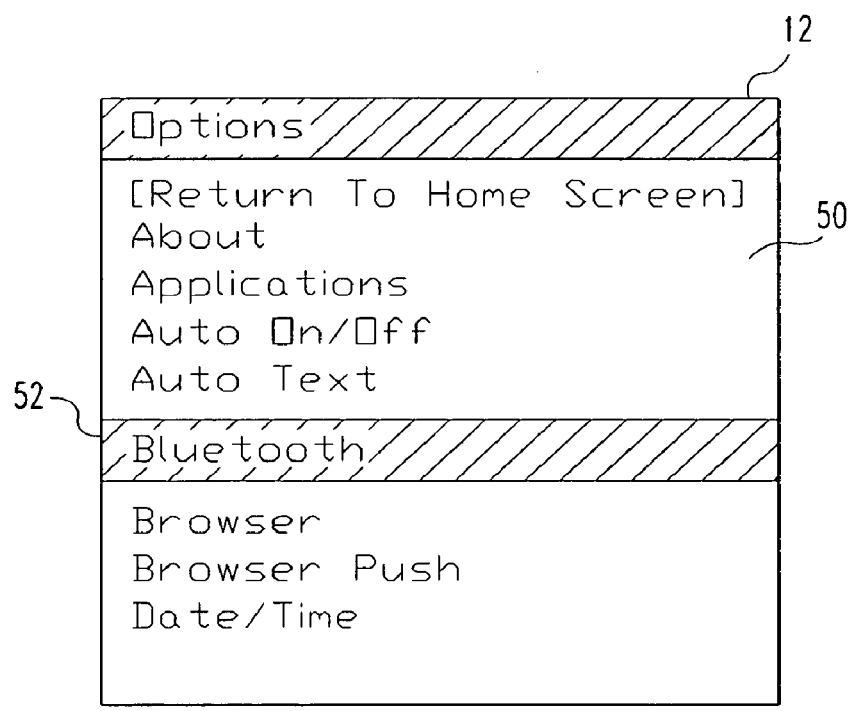
FIGS. 4, 5, 6, 7, 8, 9 and 10 are exemplary views of a portion of the display of the handheld electronic device of FIGS. 1 and 2 according to the invention.
Figure 5:
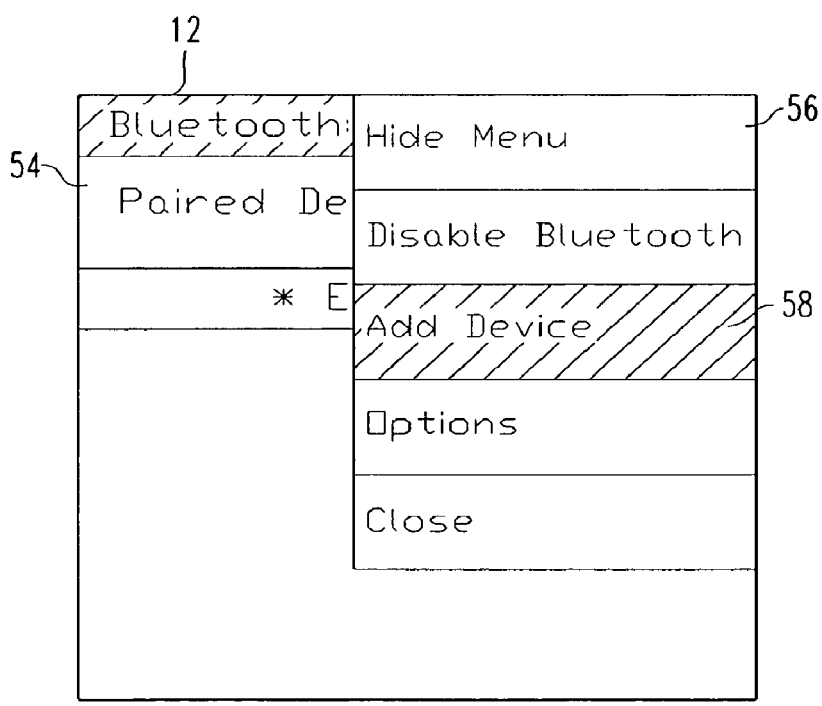

A flowchart depicting a routine performed by processor 20 for providing for simplified enabling and disabling of a short-range wireless communications element, such as a Bluetooth™ communications module, used to establish and maintain a connection to one or more other electronic devices over a short-range wireless network, such as a Bluetooth™ network, according to the invention is shown in FIG. 3. The routine begins at 100 where the processor 20 of handheld electronic device 4 receives a command from the user to enable the Bluetooth™ functionality so that handheld electronic device 4 can communicate with another Bluetooth™-capable electronic device. Such a command may be provided using input apparatus 16 in combination with display 12. FIG. 4 is an exemplary depiction of display 12 showing an "Option" screen 50 generated by an operating application of handheld electronic device 4 which provides a user with various options for controlling and changing the operating parameters of handheld electronic device 4. As seen in FIG. 4, "Option" screen 50 includes an item 52 for enabling the Bluetooth™ functionality of handheld electronic device 4. As will be appreciated, a user may scroll down and select item 52 using input apparatus 16. FIG. 5 is an exemplary depiction of display 12 showing a "Bluetooth™ Status" screen 54 that is displayed on display 12 after the Bluetooth™ functionality of handheld electronic device 4 is enabled in the manner shown in FIG. 4.

Next, referring again to FIG. 3, at 105, a user may now provide a command to processor 20 to initiate the procedure for establishing a Bluetooth™ connection between handheld electronic device 4 and another Bluetooth™-capable electronic device. In one particular embodiment of the invention, this may be accomplished by accessing menu 56 shown in FIG. 5 and selecting the "Add Device" item 58 provided therein. At this point, the Bluetooth™ communications module forming a part of short-range communications subsystem 47 of handheld electronic device 4 is enabled, meaning that its transmitter/receiver element(s) is turned on and, as a result, is consuming battery power.

Figure 6:
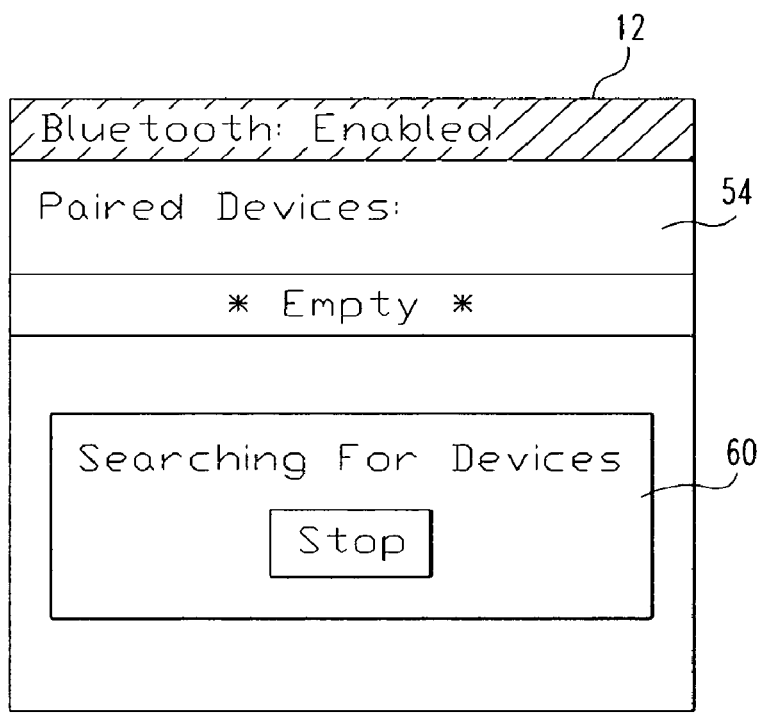
Figure 7:
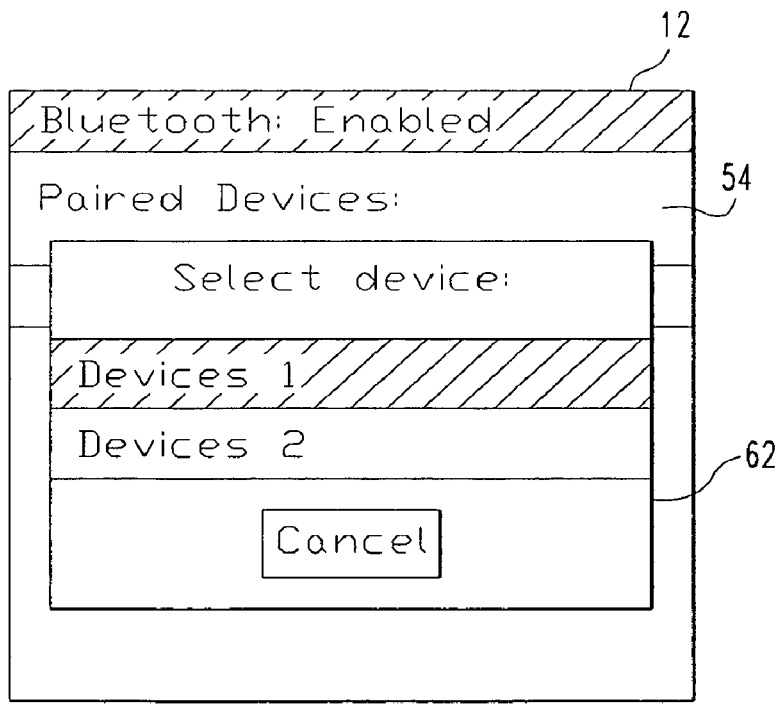

Next, at 110 in FIG. 3, handheld electronic device 4 searches for all Bluetooth™-capable electronic devices that are within range of handheld electronic device 4. FIG. 6 is an exemplary depiction of display 12 showing the "Bluetooth™ Status" screen 54 while the search is being conducted. As seen in FIG. 6, a dialog box 60 is provided on "Bluetooth™ Status" screen 54 to indicate that the search is ongoing. At 115 of FIG. 3, a determination is then made as to whether any such devices have been found. If the answer is no, then, at 120, an error message is provided to the user, preferably on display 12, indicating that a Bluetooth™ connection cannot be established because there are no other Bluetooth™-capable electronic devices within range. If the answer at 115 is yes, however, then, at 125, a listing of all Bluetooth™-capable electronic devices that are within range is provided on display 12. FIG. 7 is an exemplary depiction of display 12 showing the "Bluetooth™ Status" screen 54 including such a listing (e.g., Device 1 and Device 2) in dialog box 62.

Figure 8:
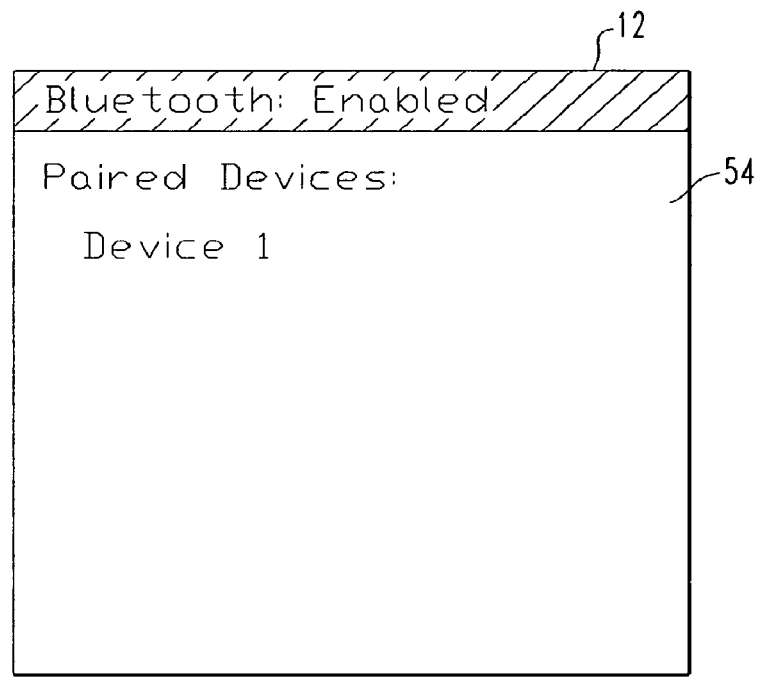

Next, at 130 of FIG. 3, a user may select a particular device from the listing provided at 125, which selection is received by processor 20 for processing. Preferably, this selection is made using dialog box 62 of FIG. 7 by selecting a particular device form the listing provided therein using input apparatus 16. Once a particular device is selected, then, at 135, processor 20 takes steps to pair handheld electronic device 4 with the selected device. As is known in the art, the term "pairing" means that the two devices have exchanged a protected passkey that has been entered into each in order to establish a trusted connection. In the preferred embodiment, the user of handheld electronic device 4 will be prompted to enter the passkey into handheld electronic device 4. Once paired, processor 20, in combination with the Bluetooth™ communications module of short-range communications subsystem 47, may then take steps to enable handheld electronic device 4 to communicate with the selected Bluetooth™-capable electronic device according to the Bluetooth™ protocol. These steps result in a piconet (a Bluetooth™ network) being created that includes handheld electronic device 4 and the selected Bluetooth™-capable electronic device. FIG. 8 is an exemplary depiction of display 12 showing the "Bluetooth™ Status" screen 54 indicating that handheld electronic device 4 has been paired with the selected Bluetooth™-capable electronic device. As will be appreciated, additional devices can be paired with handheld electronic device 4 by repeating the steps at 105 through 135.

Figure 9:
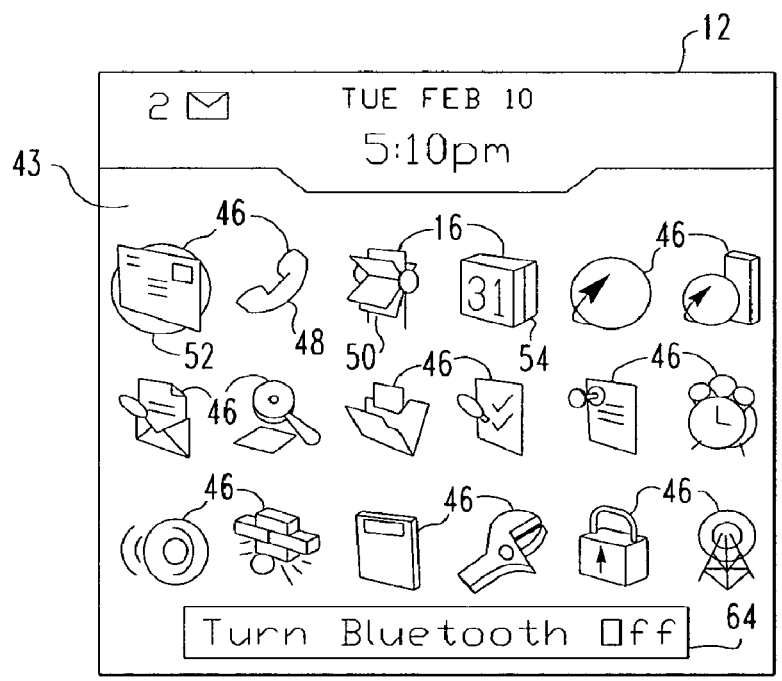
Figure 10:
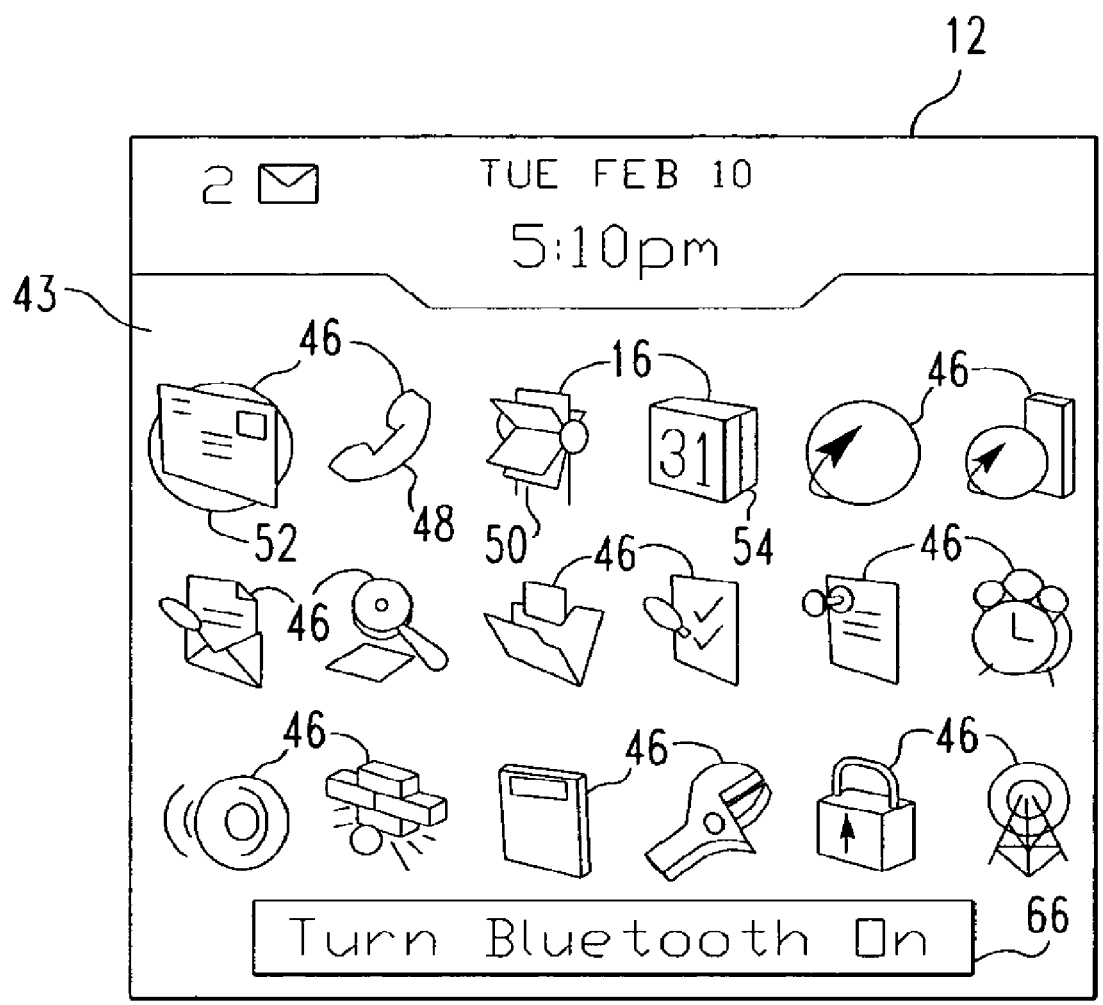

Next, referring to FIG. 3 and FIG. 9, a "Turn Bluetooth Off" icon 64 is created and displayed on home screen 43 at 140. The term icon as used herein refers to one or more pictures, graphical symbols or the like, alone or in combination, provided on a display that represents a function which, when the icon is selected or activated, such as with a mouse click, key activation or the like, causes the function to be performed. The "Turn Bluetooth Off" icon 64 according to the invention represents a function for disabling the Bluetooth™ communications module of handheld electronic device 4, meaning that its transmitter/receiver element(s) is turned off and, as a result, is not consuming battery power. At 150 of FIG. 3, a determination is then made as to whether the displayed icon is activated by the user. If the answer is no, then the routine returns to 150. If, however, the answer at 150 is yes, then, at 155, a determination is made as to whether the "Turn Bluetooth Off" icon 64 is currently displayed on home screen 43. If the answer is yes, then, at 160, the Bluetooth™ communications module of handheld electronic device 4 is disabled (as stated above, the function represented by the "Turn Bluetooth Off" icon 64 is a function for disabling the Bluetooth™ communications module). As a result, the Bluetooth™ communications module of handheld electronic device 4 will no longer consume battery power. Next, at 165, a "Turn Bluetooth On" icon 66 is created and displayed on home screen 43 as shown in FIG. 10. The "Turn Bluetooth On" icon 66 according to the invention represents a function for enabling the Bluetooth™ communications module of handheld electronic device 4, meaning that its transmitter/receiver element(s) is turned on. The routine then returns to 150 for purposes of monitoring the activation of the currently displayed icon. If the answer at 155 is no (meaning that the "Turn Bluetooth On" icon 66 is the currently displayed icon), then, at 170, the Bluetooth™ communications module of handheld electronic device 4 is enabled (as stated above, the function represented by the "Turn Bluetooth On" icon 66 is a function for enabling the Bluetooth™ communications module). As a result, handheld electronic device 4 can communicate with any electronic devices with which it is paired. In addition, the Bluetooth™ communications module of handheld electronic device 4 will once again consume battery power. The routine then returns to 170, where the "Turn Bluetooth Off" icon 64 is displayed on home screen 43.

Thus, the invention provides a handheld electronic device having a simple to access and use mechanism (the two icons alternatively provided on the home screen) for enabling and disabling a short-range wireless communications element used to create a connection to a short-range wireless network, such as a Bluetooth™ network. In this manner, the user is able to more readily actively manage the functioning of handheld electronic device to avoid unnecessary and wasteful (in terms of battery power) use of the short-range communications element of the handheld electronic device.

While specific embodiments of the invention have been described in detail, it will be appreciated by those skilled in the art that various modifications and alternatives to those details could be developed in light of the overall teachings of the disclosure. For example, while in the specific embodiment described herein Bluetooth™ is the short-range wireless communications technology and protocol that is used, it is possible to practice the invention with any other short-range wireless communications technology and protocol, such as infrared communications technology. Accordingly, the particular arrangements disclosed are meant to be illustrative only and not limiting as to the scope of the invention which is to be given the full breadth of the claims appended and any and all equivalents thereof.

What is claimed is:

1. A computer-readable memory storing one or more routines for use in the execution in a computer processor of a method of enabling and disabling a short-range wireless communications element of a handheld electronic device, the method comprising:
    enabling said short-range wireless communications element;
    pairing said handheld electronic device with a second electronic device using said short-range wireless communications element;
    providing a first icon on said handheld electronic device after pairing said handheld electronic device with said second electronic device; and
    thereafter: (i) disabling said short-range wireless communications element and replacing said first icon with a second icon on said handheld electronic device whenever said first icon is selected, and (ii) enabling said short-range wireless communications element and replacing said second icon with said first icon on said handheld electronic device whenever said second icon is selected;
    wherein said short-range wireless communications element includes a transmitter/receiver element, wherein enabling said short-range wireless communications element comprises turning said transmitter/receiver element on and disabling said short-range wireless communications element comprises turning said transmitter/receiver element off.

2. The computer-readable memory according to claim 1, said short-range wireless communications element being a communications element capable of communicating at a frequency of 2.4 Gigahertz.

3. The computer-readable memory according to claim 2, said first icon including the word "off" and said second icon including the word "on".

4. The computer-readable memory according to claim 1, said handheld electronic device having a battery, when disabled, said short-range wireless communications element does not consume power from said battery.

5. The computer-readable memory according to claim 1, said handheld electronic device having a display, said first and second icons, when provided, being displayed on said display.

6. The computer-readable memory according to claim 1, said first and second icons, when displayed, being displayed on a home screen of said handheld electronic device.

7. The method according to claim 1, said short-range wireless communications element being a communications element capable of communicating at a frequency of 2.4 Gigahertz.

8. The method according to claim 7, said first icon including the word "off" and said second icon including the word "on".

9. A handheld electronic device, comprising:
    a display;
    a short-range wireless communications element;
    a processor in communication with said short-range wireless communications element, the processor for:
    enabling said short-range wireless communications element;
    pairing said handheld electronic device with a second electronic device using said short-range wireless communications element;
    providing a first icon on said handheld electronic device after pairing said handheld electronic device with said second electronic device; and
    thereafter: (i) disabling said short-range wireless communications element and replacing said first icon with a second icon on said handheld electronic device whenever said first icon is selected, and (ii) enabling said short-range wireless communications element and replacing said second icon with said first icon on said handheld electronic device whenever said second icon is selected;
    wherein said short-range wireless communications element includes a transmitter/receiver element, wherein enabling said short-range wireless communications element comprises turning said transmitter/receiver element on and disabling said short-range wireless communications element comprises turning said transmitter/receiver element off.

10. The handheld electronic device according to claim 9, said short-range wireless communications element being a communications element capable of communicating at a frequency of 2.4 Gigahertz.

11. The handheld electronic device according to claim 10, said first icon including the word "off" and said second icon including the word "on".

12. The handheld electronic device according to claim 9, said handheld electronic device having a battery, when disabled, said short-range wireless communications element does not consume power from said battery.

13. The handheld electronic device according to claim 9, said handheld electronic device having a display, said first and second icons, when provided, being displayed on said display.

14. The handheld electronic device according to claim 9, said first and second icons, when displayed, being displayed on a home screen of said handheld electronic device.

15. A method of enabling and disabling a short-range wireless communications element of a handheld electronic device, comprising:
    enabling said short-range wireless communications element;

pairing said handheld electronic device with a second electronic device using said short-range wireless communications element;

providing a first icon on said handheld electronic device after pairing said handheld electronic device with said second electronic device; and thereafter: (i) disabling said short-range wireless communications element and replacing said first icon with a second icon on said handheld electronic device whenever said first icon is selected, and (ii) enabling said short-range wireless communications element and replacing said second icon with said first icon on said handheld electronic device whenever said second icon is selected.

16. The method according to claim 15, said handheld electronic device having a battery, wherein when enabled, said short-range wireless communications element consumes power from said battery, and when disabled, said short-range wireless communications element does not consume power from said battery.

17. The method according to claim 15, said handheld electronic device having a display, said first and second icons, when provided, being displayed on said display.

18. The method according to claim 15, said first and second icons, when displayed, being displayed on a home screen of said handheld electronic device.

* * * * *

UNITED STATES PATENT AND TRADEMARK OFFICE
CERTIFICATE OF CORRECTION

PATENT NO. : 8,364,082 B2  Page 1 of 1
APPLICATION NO. : 12/861597
DATED : January 29, 2013
INVENTOR(S) : Andrew Douglas Bocking, Omar G. J. Barake and David I. Schifman It is certified that error appears in the above-identified patent and that said Letters Patent is hereby corrected as shown below:

On the Title Page, item (75), "...David I. Shifman..." should read --...David I. Schifman...--

Signed and Sealed this
Eighteenth Day of June, 2013

Teresa Stanek Rea
*Acting Director of the United States Patent and Trademark Office*